United States Patent
Makadia (10) Patent No.: US 8,957,141 B2
(45) Date of Patent: Feb. 17, 2015

(54) NON HALOGEN FLAME RETARDANT THERMOPLASTIC POLYURETHANE

(75) Inventor: Chetan M. Makadia, Strongsville, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 13/885,412

(22) PCT Filed: Aug. 24, 2011

(86) PCT No.: PCT/US2011/048921
§ 371 (c)(1),
(2), (4) Date: Jul. 22, 2013

(87) PCT Pub. No.: WO2012/067685
PCT Pub. Date: May 24, 2012

(65) Prior Publication Data
US 2013/0330468 A1     Dec. 12, 2013

Related U.S. Application Data

(60) Provisional application No. 61/414,083, filed on Nov. 16, 2010.

(51) Int. Cl.
| | | |
|---|---|---|
| *C08K 5/3492* | (2006.01) | |
| *C09D 5/18* | (2006.01) | |
| *C08K 5/52* | (2006.01) | |
| *C08L 75/04* | (2006.01) | |
| *H01B 3/18* | (2006.01) | |
| *C08K 5/00* | (2006.01) | |
| *C08K 5/51* | (2006.01) | |
| *C08K 5/521* | (2006.01) | |
| *C08K 5/523* | (2006.01) | |

(52) U.S. Cl.
CPC ... *C09D 5/18* (2013.01); *C08K 5/52* (2013.01); *C08L 75/04* (2013.01); *H01B 3/18* (2013.01); *C08K 5/0008* (2013.01); *C08K 5/005* (2013.01); *C08K 5/0066* (2013.01); *C08K 5/51* (2013.01); *C08K 5/521* (2013.01); *C08K 5/523* (2013.01)
USPC ........... 524/100; 524/127; 524/140; 524/141; 524/432; 524/451; 174/110 SR (58) Field of Classification Search
USPC ................. 524/100, 127, 140, 141, 432, 451; 174/110 SR
See application file for complete search history.

(56) References Cited

U.S. PATENT DOCUMENTS

| | | |
|---|---|---|
| 5,110,850 A | 5/1992 | Farkas |
| 5,837,760 A | 11/1998 | Hackl |
| 6,777,466 B2 | 8/2004 | Eckstein |
| 8,017,676 B2 * | 9/2011 | Kim et al. ..................... 524/100 |
| 2008/0167408 A1 | 7/2008 | Siddhamalli |
| 2013/0081853 A1* | 4/2013 | Mundra et al. .......... 174/110 SR |

FOREIGN PATENT DOCUMENTS

| | | |
|---|---|---|
| EP | 1026700 | 8/2000 |
| EP | 1516907 | 3/2005 |
| EP | 2210914 | 7/2010 |
| EP | 2311908 | 4/2011 |

OTHER PUBLICATIONS

IPRP of corresponding International Application No. PCT/US2011/048921 dated Nov. 2, 2012.
Corresponding International Publication No. WO 2012/067685 A1 published May 24, 2012.

* cited by examiner

*Primary Examiner* — Peter Szekely
(74) *Attorney, Agent, or Firm* — Christopher P. Demas, Esq.; Teresan W. Gilbert, Esq.

(57) ABSTRACT

A non-halogen flame retardant thermoplastic polyurethane composition containing: a) an organic non-halogenated flame retardant package which contains non-reacted components, i) an organic phosphate compound which is melamine free, ii) a mixture of an organic phosphate in combination with an organic phosphoric acid; and iii) a zinc oxide, b) a stabilizer, c) optionally inorganic flame retardant components, and d) optionally non-flame retardant additives, resulting in a TPU composition with excellent tensile strength and improved high flame performance and low smoke properties.

18 Claims, 1 Drawing Sheet

NON HALOGEN FLAME RETARDANT THERMOPLASTIC POLYURETHANE

FIELD OF THE INVENTION

The present invention relates to flame retardant thermoplastic polyurethane (TPU) compositions, and more particularly to flame retardant thermoplastic polyurethane compositions comprising a plurality of non halogen flame retardants. It is desirable to provide a TPU composition with excellent mechanical properties such as good tensile strength and high flexibility. It is also desirable to provide a TPU composition with improved flame retardant characteristics such that the material will pass high level flame tests, have a high limiting oxygen index (LOI), and possess low smoke properties. The TPU compositions are useful for applications where high flame performance and low smoke properties as well as high tensile strength are desirable, such as wire and cable applications, film applications, molding applications, and the like. This invention also relates to processes to produce the non-halogen flame retardant TPU compositions and processes to produce wire and cable jacketing from such compositions.

BACKGROUND OF THE INVENTION

Halogen additives, such as those based on fluorine, chlorine, and bromine, have been used to give flame retardant properties to TPU compositions. In recent years, certain end use applications that contain TPU specify that the TPU composition be halogen free. This has required TPU formulators to search for other flame retardants to replace the previously used halogen additives.

U.S. Pat. No. 6,777,466 assigned to Noveon IP Holding Co. discloses the use of melamine cyanurate as the only organic flame retardant additive in a thermoplastic polyurethane composition.

U.S. Pat. No. 5,837,760 assigned to Elastogram GmbH discloses a self-extinguishing flame retardant, thermoplastic polyurethane that contains one or more organic phosphonates and one or more organic phosphonates mixed with a melamine derivative.

U.S. Pat. No. 5,110,850 assigned to B.F. Goodrich Co. discloses halogen free flame retardant thermoplastic polymers where the sole flame retardant is a melamine that is derivative free.

WO 2006/121549 assigned to Noveon, Inc. discloses a thermoplastic polyurethane containing a flame retardant combination including phosphinate compounds, phosphate compounds and a pentaerythritol and dipentaerythritol component.

Still, there exists a need in the art for effective non-halogenated flame retardant combinations that impart flame retardant characteristics to thermoplastic polyurethane compositions while not impairing mechanical strength and processability.

BRIEF DESCRIPTION OF THE DRAWING

The present invention may be more readily understood by reference to the following drawing in which.

SUMMARY OF THE INVENTION

It is an object of the invention to provide a non-halogen flame retardant TPU composition which provides the desired flame retardant capabilities as well as exhibiting good processing and mechanical properties.

It is an object of the invention to provide a flame retardant package with low smoke properties and improved tensile strength for use with thermoplastic polyurethanes.

It is an object of the invention to provide a method for rendering a TPU composition flame retardant with low smoke properties and improved tensile strength.

It is an object of the invention to provide a process for making a non-halogen flame retardant TPU composition which is suitable for flame retardant insulation and/or jacketing in wire and cable applications.

It is an object of the invention to provide a wire and cable jacket construction utilizing a flame retardant TPU composition with low smoke properties and a high limiting oxygen index as well as high tensile strength.

In one aspect of the invention, a TPU composition is provided, which comprises at least one thermoplastic polyurethane polymer; a flame retardant package containing at least one organic phosphate compound; and a mixture of at least one phosphate, at least one phosphoric acid, and zinc oxide; and at least one stabilizer.

In another aspect, the thermoplastic polyurethane polymer is selected from polyester polyurethane, polyether polyurethane, polycarbonate polyurethane, and blends thereof.

In another aspect, the flame retardant package confers at least one predetermined flame retardant characteristic to the TPU composition such as low smoke characteristics wherein the smoke density (Ds) at 1.5 min<100 and Ds at 4 min<200 in either flaming or non-flaming mode.

In another aspect, a wire and cable construction is produced by extruding an insulation layer of a non-conducting polymeric material onto at least one metal conductor; and extruding a flame retardant jacket to cover the insulated metal conductor. The jacket is a non-halogen flame retardant TPU composition of the present invention.

DETAILED DESCRIPTION OF THE INVENTION

The TPU compositions of the present invention comprise at least one TPU polymer along with flame retardant components and at least one stabilizer.

The TPU polymer type used in this invention can be any conventional TPU polymer that is known to the art as long as the TPU polymer is capable of imparting the desired mechanical and physical properties to the final flame retardant composition, in particular good tensile strength.

Embodiments of the invention include adding certain flame retardant components to the TPU polymer to achieve the desired flame retardant properties of the TPU composition. The organic flame retardant components are non-halogen compounds. The components in the flame retardant package do not react. In another embodiment of the invention the components in the flame retardant package do not significantly react.

The flame retardant package contains at least one of an organic phosphate component. The organic phosphate component is melamine free and melamine derivative compound free. Illustrative phosphates that can be used in the flame retardant package include, triarylphosphate, polyarylphosphate esters, such as triphenylphosphate, tricresylphosphate, trixylylphosphate, cresyl diphenylphosphate, diphenyl xylylphosphate, 2-biphenyldiphenylphosphate, alkylated polyaryl phosphate esters such as butylated triphenylphosphate, t-butylphenyl diphenylphosphate, bis(t-butyl)phenylphosphate, tris(t-butylphenyl)phosphate, tris(2,4-di-t-butylphenyl)phosphate, isopropylated triphenylphosphates, isopropylated t-butylated triphenylphosphates, t-butylated triphenylphosphates, isopropylphenyl diphenyl phosphate, bis(isopropylphenyl)phenylphosphate (3,4-diisopropylphenyl)diphenylphosphate, tris(isopropylphenyl)phosphate, (1-methyl-1-phenylethyl)phenyl diphenyl phosphate, nonylphenyl diphenyl phosphate, 4-[4-hydroxyphenyl(propane-2,2-diyl)]phenyl diphenyl phosphate, 4-hydroxyphenyl diphenyl phosphate, resorcinol bis(diphenyl phosphate), bisphenol A bis(diphenyl phosphate), bis(ditolyl)isopropylidenedi-p-phenylene bis(phosphate), O,O,O,O'-tetrakis(2,6-dimethylphenyl)-O,O'-m-phenylene bisphosphate, alkylarylphosphate esters such as 2-ethylhexyl diphenylphosphate, isodecyl diphenylphosphate, diethylphenethylamidophosphate diisodecyl phenyl phosphate, dibutyl phenyl phosphate, methyl diphenyl phosphate, butyl diphenylphosphate, diphenyl octyl phosphate, isoctyl diphenyl phosphate, isopropyl diphenyl phosphate, diphenyl lauryl phosphate, tetradecyl diphenylphosphate, cetyl diphenyl phosphate, tar acids cresylic diphenyl phosphates, trialkyl phosphate esters, such as triethylphosphate, tributylphosphate, tri(butoxyethyl)phosphate, 3-(dimethylphosphono) propionic acid methylamide, pentaerythritol cyclic phosphate, and combinations thereof.

In one embodiment, the organic phosphate component is a triphenyl phosphate, and a phosphorus based flame retardant, namely NcendX® P-30 (bisphenol A bis diphenyl phosphate) from Albermarle Corporation and combinations thereof.

The organic phosphate component is present in an amount from about 5 to about 25 weight percent, in another embodiment from about 5 to about 15 weight percent, and in another embodiment from about 5 to about 10 weight percent of the total weight of the TPU composition.

The flame retardant package further comprises a component of a mixture of an organic phosphate in combination with an organic phosphoric acid compound and optionally with a zinc oxide. The mixture does not react with the other components in the flame retardant package. In such mixture, the weight ratio of phosphate compound to phosphoric acid compound is 1:0.01 to 1:2, and in another embodiment 1:0.01 to 1:2, and in another embodiment 1:0.07 to 1:2.

The phosphate compound in the mixture includes piperazine pyrophosphate, piperazine polyphosphate and combinations thereof.

The phosphoric acid compounds in the mixture include phosphoric acid, melamine pyrophosphate, melamine polyphosphate, melamine phosphate and combinations thereof. In one embodiment the phosphoric acid is melamine phosphate.

In one embodiment, the phosphoric acid compound in the mixture excludes cyanurate, cyanuric acid and each of their derivatives.

The mixture is present in the amount of about 10 to about 60 weight percent, in another embodiment from about 15 to about 45 weight percent and in another embodiment about 20 to about 35 weight percent of the total weight of the TPU composition.

The flame retardant package further comprises a zinc oxide component. The zinc oxide does not react with the other components in the package and in one embodiment the zinc oxide does not react appreciably with the other components in the package.

The zinc oxide is used in the amount from about 0.01 weight percent to about 5 weight percent, and in another embodiment about 0.8 weight percent to about 1.6 weight percent of the total weight of the TPU composition.

The flame retardant TPU composition also includes a stabilizer. The stabilizers include antioxidants such as phenolics, phosphites, thioesters, and amines, light stabilizers such as hindered amine light stabilizers and benzothiazole UV absorbers, and other process stabilizers and combinations thereof. In one embodiment the preferred stabilizer is Irganox 1010 from Ciba-Geigy Corp. and Naugard 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In one embodiment, the TPU composition is substantially halogen-free and in another embodiment the TPU composition is halogen free.

In addition, various conventional inorganic flame retardant components may be employed in the flame retardant TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nanoclay, and mixture thereof. In one embodiment, the flame retardant package includes talc. The talc in the flame retardant package promotes properties of high LOI. The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

In one embodiment, a flame retardant TPU composition contains thermoplastic polyurethane polymer, at least one stabilizer and a flame retardant package comprising an organic phosphate compound, a mixture of phosphate compounds in combination with phosphoric acid compounds, zinc oxide and talc components. In another embodiment, inorganic flame retardants may be incorporated into the flame retardant package such as talc. In another embodiment, non-flame retardant additives may be incorporated into the flame retardant TPU composition with or without inorganic flame retardants.

For some applications, optional additives, which are not flame retardants, may be used in the TPU compositions. The additives include colorants, antioxidants (including phenolics, phosphites, thioesters, and/or amines), antiozonates, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof. The additives are used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

For this purpose, the flame retardant package, stabilizer, optional flame retardant additives and/or optional additives can be incorporated into the components, or into the reaction mixture for the preparation of the TPU composition or after making the TPU composition, which in one embodiment is preferred. In another process, all the materials can be mixed with the TPU and then melted or they can be incorporated directly into the melt.

In one embodiment, the TPU polymer may be prepared by reacting a polyisocyanate with an intermediate such as a hydroxyl terminated polyester, a hydroxyl terminated polyether, a hydroxyl terminated polycarbonate or mixtures thereof, with one or more glycol chain extenders, all of which are well known to those skilled in the art. U.S. Pat. No. 6,777,466 to Eckstein et al. provides detailed disclosure of processes to provide certain TPU polymers that may be utilized in embodiments of the present invention and is incorporated herein in its entirety.

The TPU polymer type used in this invention can be any conventional TPU polymer that is known to the art and in the literature as long as the TPU polymer has adequate molecular weight. The TPU polymer is generally prepared by reacting a polyisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethyl glycol) comprising water reacted with tetrahydrofuran (PTMG). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 500 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate.

U.S. Pat. No. 4,131,731 discloses hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures.

When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl) ether, neopentyglycol, and the like, with 1,4-butanediol being preferred.

The desired TPU polymer used in the TPU composition is generally made from the above-noted intermediates such as a hydroxyl terminated polyesters, polyether, or polycarbonate, preferably polyether, which is further reacted with a polyisocyanate, preferably a diisocyanate, along with extender glycol desirably in a so-called one-shot process or simultaneous coreaction of polyester, polycarbonate or polyether intermediate, diisocyanate, and extender glycol to produce a high molecular weight linear TPU polymer. The preparation of the macroglycol is generally well known to the art and to the literature and any suitable method may be used. The weight average molecular weight (Mw) of the TPU polymer is generally about 80,000 to 800,000, and preferably from about 90,000 to about 450,000 Daltons. The equivalent weight amount of diisocyanate to the total equivalent weight amount of hydroxyl containing components, that is the hydroxyl terminated polyester, polyether, or polycarbonate, and chain extender glycol, is from about 0.95 to about 1.10, desirably from about 0.96 to about 1.02, and preferably from about 0.97 to about 1.005. Suitable diisocyanates include aromatic diisocyanates such as: 4,4'-methylenebis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylenebis(phenyl isocyanate), i.e., MDI.

In one embodiment, the TPU is substantially free of crosslinking and preferably free of crosslinking.

The desired TPU polymer utilized in the TPU composition is generally made from the above-noted intermediates in a so-called one-shot process or simultaneous coreaction of polyester, polycarbonate or polyether intermediate; polyisocyanate; and chain extender to produce a high molecular weight linear TPU polymer.

In one embodiment, the one-shot polymerization process generally occurs in situ, wherein a simultaneous reaction occurs between the components, that is, the one or more intermediates, the one or more polyisocyanates, and the one or more chain extenders. The reaction is generally initiated at temperatures of from about 100° C. to about 120° C. Inasmuch as the reaction is exothermic, the reaction temperature generally increases to about 220° C.-250° C. In one exemplary embodiment, the TPU polymer may be pelletized following the reaction. The flame retardant components and/or stabilizer may be incorporated during making the TPU and/or with the TPU polymer pellets to form a flame retardant composition in a subsequent process. The optional flame retardant additives and/or optional non-flame retardant additives may be incorporated during making the TPU and/or with the TPU polymer pellets to form a flame retardant composition in a subsequent process.

The TPU polymer and organic flame retardant components and other components may be compounded together by any means known to those skilled in the art. If a pelletized TPU polymer is used, the polymer may be melted at a temperature of about 150° C. to 230° C., preferably from about 160-190° C., and more preferably from about 170-180° C. The particular temperature used will depend on the particular TPU polymer used, as is well understood by those skilled in the art. The TPU polymer and the flame retardant components, stabilizer and/or optional additives are blended to form an intimate physical mixture. Blending can occur in any commonly used mixing device able to provide shear mixing, but a twin screw extruder having multiple heat zones with multiple feeding ports is preferably used for the blending and melting process.

The TPU polymer, flame retardant components and stabilizer and optional additives may be pre-blended before adding to the compounding extruder or they may be added or metered into the compounding extruder in different streams and in different zones of the extruder.

In another embodiment, the TPU polymer is not pelletized prior to the addition of the flame retardant components. Rather, the process for forming a flame retardant thermoplastic polyurethane composition is a continuous in situ process. The ingredients to form the thermoplastic polyurethane polymer are added to a reaction vessel, such as a twin screw extruder as set forth above. After formation of the thermoplastic polyurethane polymer, the flame retardant components, stabilizer and the optional additives may be added or metered into the extruder in different streams and/or in different zones of the extruder in order to form a thermoplastic polyurethane composition. The flame retardant components, stabilizer and/or optional additives are added in a quantity sufficient to impart at least one predetermined flame retardant characteristic to the composition, as set forth in further detail below.

The resultant TPU composition may exit the extruder die in a molten state and be pelletized and stored for further use in making finished articles. The finished articles may comprise injection-molded parts, especially using TPU compositions based on polyether, polycarbonate, or polyester polyurethane. Other finished articles may comprise extruded profiles. The TPU composition may be utilized as a cable jacket as set forth in further detail below.

Thermoplastic polyurethanes are generally valued in end use applications because of their abrasion and wear resistance, low temperature flexibility, hydrolytic stability, toughness and durability, ease of processing, tensile strength and other attributes. When additives, such as flame retardants, are present in a TPU composition, there may be some reduction in the desired material properties. The flame retardant package should thus impart the desired flame retardancy and low smoke properties without overly sacrificing other material properties.

The desired ultimate tensile strength of the TPU composition of this invention depends on the end use application. For example, in more demanding wire and cable jacketing applications, the ultimate tensile strength must be greater than about 3000 psi and preferably greater than 3500 psi. Other applications which are not as critical as the demanding wire and cable jacketing such as blown film, moldings, and the like, can use lower ultimate tensile strength, such as greater than 1500 psi. The ultimate tensile strength of the TPU composition is measured according to ASTM D412. The tensile strength for TPU composition of the present invention is measured at 500 mm/min (20"/min). In one embodiment, the ultimate tensile strength for TPU composition of the present invention is at least 4000 psi and an ultimate elongation of at least 400%. In another embodiment, the ultimate tensile strength for TPU composition of the present invention is at least 3500 psi and an ultimate elongation of at least 400%. In another embodiment, the ultimate tensile strength for TPU composition of the present invention is at least 3500 psi and an ultimate elongation of at least 400%. Each time the TPU composition is heated for further thermal processing (compounding, extruding into jacket, and the like), the ultimate tensile strength will decrease as will the Mw also decrease. It is also important to note that the ultimate tensile strength referred to in this disclosure is the tensile strength measured at 500 mm/min grip separation speed.

The TPU compositions may be extruded into the jacket from previously made TPU composition. Usually, the TPU composition is in the form of pellets for easy feeding into the extruder. This method is the most common since the TPU composition is not normally made by the same party that makes the wire and cable construction. However, in accordance with an embodiment of the invention, the wire and cable jacket could be extruded directly from the compounding extruder without going through the separate step of pelletizing the flame retardant TPU composition.

One flame retardant characteristic conferred on the TPU composition is improved limiting oxygen index (LOI). The limiting oxygen index (LOI) can be linearly related to flame resistance. That is, the higher the LOI, the better the char formation. The LOI is the minimum percentage of oxygen which allows a sample to sustain combustion under specified conditions in a candle-like fashion, and thus may be considered to measure the ease of extinction of a sample. The LOI test has been formalized as ASTM D2863. In many applications, the flame retardant TPU must meet a certain LOI standard. In one embodiment of the present invention provides a flame retardant TPU composition having an LOI of greater than 30 and as high as 37. In one embodiment, the LOI is 32 and in another embodiment the LOI is 33. LOI results of at least 32 are unexpected for TPU compositions, as normally the LOI is less than 30, and more typically about 25 for flame retarded TPU compositions. Many customers require an LOI of 35 for cables that are placed in trays in buildings and this requirement of a (35) LOI has precluded the use of TPU in this application.

There are many flammability tests used for classifying materials with respect to flame resistance, such as UL subject 94 vertical (UL-94 V) burning test, NFPA 701, and UL-1581, as well as others. Each of these tests was designed to address problems presented by a specific product design and application, which could not be predicted by other test procedures. Thus, if a product passed one type of flame test, it does not mean it would pass also a flame test done at a higher temperature, a different geometry, a different thickness, or in the final construction of the article. Another flame retardant characteristic is measured by the Underwriters Laboratories Vertical Burn Standard—UL 94 (UL-94). Embodiment of the present invention provides a flame retardant TPU composition able to obtain a non-dripping V0 rating on UL-94 test at a thickness of about 125 mils. As the UL rating should always be reported with the thickness, an exemplary embodiment achieves a V0 rating at a thickness of about 125 mils and does not drip. The flame retardant TPU composition of the invention achieves a V0 with non-dripping properties.

Another flame retardant characteristic is low smoke density as measured by ASTM E 662. An embodiment of the present invention provides a flame retardant TPU composition able to obtain a smoke density ($D_S$) at 1.5 min<100 and in another embodiment $D_S$ at 4 min<200 in either flaming or non-flaming mode. It is very desirable to have low smoke properties especially in transportation applications. The TPU compositions, because of their flame retardant properties, abrasion resistance and good tensile strength, are particularly suited for use as insulation and/or jacketing for electrical conductors in wire and cable construction applications, such as jacketing for armored cable, industrial robotic equipment, non-metallic sheath cable, deep well pump cables and other multiple conductor assemblies. The fire performance of a wire and cable construction can be influenced by many factors, with the jacket being one factor. The flammability of the insulation material can also affect the fire performance of the wire and cable construction, as well as other inner components, such as paper wrappings, fillers, and the like. A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be polyvinyl chloride, polyethylene, cross-linked polyethylene, fluorocarbon polymers, and the like. The insulated conductors may be wrapped with metal, a fiberglass or other non-flammable textile. The multiple conductors are then encased in a jacket material (i.e., the TPU composition of this invention) to protect the electrical conductors. It is necessary for this jacket material to be, flame resistant in case a fire occurs.

Figure 1:
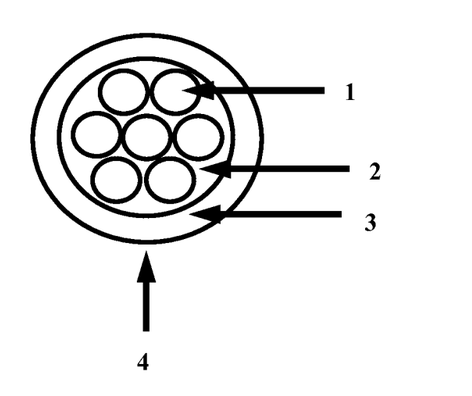
FIG. 1 is a schematic of a cable using the material of the invention.

Embodiments of wire and cable constructions are made by extruding the TPU composition onto a bundle of insulated conductors to form a jacket around the insulated conductors. FIG. 1 is a schematic of the cable which shows a cable generally at 4 made of an electrical insulators 1 and a non woven tape binder 2 and the TPU composition 3. The thickness of the jacket depends on the requirements of the desired end use application. Typical thickness of the jacket is from about 0.010 to 0.200 inch and more typical from about 0.020 to about 0.060 inch. The thinnest jacket is typically about 20 to 30 mils (0.508 to 0.762 mm) and therefore, a minimum LOI of 30 is desirable at that thickness to make the jacket suitable for use in tray cable burn applications. Cable jackets that contain electrical conductors need to be flame resistant in case a fire occurs. Employing the TPU composition of this invention in the jacket material lowers the cable jacket burn times. The flame retardant properties of the cable jacket are measured by the VW-1 test. The VW-1 test measures a vertical specimen of the finished cable for not conveying the flame along its length and not conveying the flame to combustible materials in its vicinity. Embodiments of the present invention as the material for a cable jacket provide improved flame retardant properties.

The invention will be better understood by reference to the following examples.

EXAMPLES

Examples 1, 2 and 3 are presented in Table 1 to show the preferred non-halogen flame retardants in a polyether TPU formulation. All three examples use a 95 Shore A hardness TPU in pellet form, which was made from a polyteteramethylene ether glycol (PTMEG) ether intermediate, butanediol (BDO) chain extender and MDI diioscyanate. In Examples 1, 2 and 3 of the present invention, phosphate flame retardant available in liquid form was blended with PTMEG ether intermediate prior to the TPU reaction. In Examples 1, 2 and 3, flame retardant FP-2200, talc and additives 1 to 4 were added by shear mixing in the extruder.

Examples 4 to 7 are comparative examples presented in Table 2 to further illustrate the uniqueness of the present invention. All comparative examples were made from a PTMEG ether intermediate, butanediol (BDO) chain extender and MDI diioscyanate. In all the comparative examples, flame retardant was added in liquid form and blended with PTMEG ether intermediate prior to the TPU reaction. The other additives were added by shear mixing in the extruder.

TABLE 1

| Examples | | | |
|---|---|---|---|
| Ingredients (wt. %) | 1 | 2 | 3 |
| Ether TPU[1] | 63 | 62.955 | 62.685 |
| FP-2200[2] | 27 | 27 | 27 |
| Talc | 2 | 2 | 2 |
| Phosphate[3] | 7 | 7 | 6.965 |
| Additive 1[4] stabilizer | 0.2 | | |
| Additive 2[5] stabilizer | 0.5 | 0.345 | 0.345 |
| Additive 3[6] stabilizer | 0.3 | | |
| Additive 4[7] | | 0.7 | 1 |
| | 100.0 | 100.0 | 100.0 |

[1] 95A Shore hardness TPU
[2] ADK stabilizer FP-2200 available from Adeka corporation
[3] NcendX ® P-30 from Albermarle Corporation (bisphenol A bis(diphenyl phosphate) CAS No. 181028-79-5)
[4] Irganox 1010 from Ciba-Geigy Corp. Stabilizer-(Phenolic antioxidant of a pentaerythritol tetrakis (3-(3,5 di tert-butyl-4-hydroxyphenyl) propionate; CAS No. 6683-19-8.)
[5] Tinuvin 328 from Ciba-Geigy Corp. Stabilizer-(Benzotriazole UV absorber of a 2-(2H-benzotriazol-2-yl)-4,6 di tert pentylphenol, CAS No. 25973-55-1)
[6] Tinuvin 770 from Ciba-Geigy Corp. Stabilizer-(Hindered amine light stabilizer of a Bis(2, 2,6,6,-tetramethyl-4-piperidyl sebacate, CAS No. 52829-07-9)
[7] Naugard 445 from Chemtura (Aromatic Amine, 4,4'-Bis(alpha,alpha-dimethylbenzyl) diphenylamine, CAS No. 10081-67-1)

TABLE 2

| | Comparative Examples | | | |
|---|---|---|---|---|
| Ingredients (wt. %) | 4 | 5 | 6 | 7 |
| Ether TPU[8] | 68.95 | | | 69.3 |
| Ether TPU[1] | | 63 | 62.1 | |
| FP-2200[2] | 30 | | | |
| Talc | | 2.8 | 2.8 | |
| Phosphate[3] | | 7 | 6.9 | |
| Additive 1[4] | | | | |
| Additive 2[5] | 0.35 | | | |
| Additive 3[6] | | | | |
| Additive 4[7] | 0.7 | | 1 | 0.7 |
| Phosphinate[9] | | 20 | 20 | |
| Dipentaerythritol | | 7 | 7 | |
| Dialkylated Diphenylamine[10] | | 0.1 | 0.1 | |
| Hindered Phenol[11] | | | 0.1 | |
| Melamine Cyanurate | | | 0.1 | 30 |
| | 100.0 | 100.0 | 100 | 100.0 |

[8] 85A Shore hardness polyether TPU as specified in the prior art, and with a crosslinker of trimethylolpropane
[9] Exolit OP 1311 from Clariant GmbH
[10] Statlite S from The Lubrizol Corporation. (Mixture of octylated diphenylamines, Benzenamine, N-phenyl-, reaction product with 2,4,4-trimethylpentene, CAS No. 68411-46-1)
[11] Irgnox 245 from Ciba-Geigy corp. (Sterically hindered phenolic antioxidant, Ethylenebis (oxyethylene)bis-(3-(5-tert-butyl-4-hydroxy-m-tolyl)-propionate CAS No. 36443-68-2)

The test results of the above compositions are shown in Table 3 below.

TABLE 3

| | Results | | | | | | |
|---|---|---|---|---|---|---|---|
| | 1 | 2 | 3 | 4 | 5 | 6 | 7 |
| Tensile strength (psi) ASTM D412 20"/min cross head speed | >3400 | 4040 | 4120 | — | 1450 | 1450 | 3500 |
| UL 94 at 75 mil thickness | VO | VO | ***VO/V2 | V2 | VO | VO | V2 |
| LOW SMOKE | yes | * | * | ** | no | ** | yes |
| LOI | >30 | 32 | 33 | — | 37 | 37 | 22 |

* not tested but example 1 is representative of examples 2 and 3 so expect low smoke properties
** not tested
*** 95% of time obtain a VO The test results demonstrate that example 1, 2 & 3 of the invention have properties of low smoke and good LOI and VO with no dripping and very improved tensile strength. The comparative example 7 has good tensile strength but a V2 rating and LOI of 22. Therefore, the flame retardant TPU composites of the present invention are unexpectedly better for flame retardant applications such as jacketing and/or insulating wire and cable.

All compounds exhibited good processability in both the production of the TPU polymer and in the extrusion of the compound into sheet form.

Wire and cable constructions were made by extruding the TPU composition of example 1 and comparative example 7 onto a bundle of insulated conductors to form a jacket around the insulated conductors pursuant to FIG. 1 below.

TABLE 4

| Details of Cable Components in FIG.-1 | |
|---|---|
| Item No from the FIG. | Components of Cable |
| 1 | 18AWG (41/30) Tinned Plated Copper, 0.010" Polyethylene |

TABLE 4-continued

Details of Cable Components in FIG.-1

| Item No from the FIG. | Components of Cable |
|---|---|
|  | insulation (Dow DFDB 6005 NT), Nominal OD: 0.066" |
| 2 | Non-woven tape binder |
| 3 | One of the following TPU of Example 1 TPU of Example 7 |

The cable samples constructed as per FIG. 1 and Table 4 were tested according to the VW-1 cable flame test. The VW-1 Flame Test is a vertical-wire test and is a small scale test conducted on a single cable/wire. In the test standard, the test flame is to be nominally 125 mm high and is to produce heat at the nominal rate of 500 W. The period between applications is to be 15 s where the specimen flaming ceases within 15 s or less time, or the duration of the specimen flaming where the specimen flame persists longer than 15 s. Example 1 and comparative example 7 were tested by the VW-1 Flame Test.

Table 5 shows results of VW-1 cable flame test. Burn times are recorded in seconds (s). It can be seen that cable jacketed with comparative example 7 fails to pass the VW-1 test as cable samples continue to burn longer than 60 s. Cable jackets made with the TPU materials of the present invention, example 1, passed the VW-1 cable flame test at both thicknesses. Burn times after each application of flame were very low, indicator flag was uncharred/unburned and no flaming drips were observed.

TABLE 5

Results of VW-1 Cable Flame Test.

|  |  | Jacket Material | | | |
|---|---|---|---|---|---|
|  |  | Example 7 | | Example 1 | |
|  |  | Jacket Thickness | | | |
|  |  | 30 mil | 60 mil | 30 mil | 60 mil |
| Sample 1 | Burn 1 | 0 | 1 | 1 | 2 |
|  | Burn 2 | 1 | 1 | 1 | 6 |
|  | Burn 3 | 52 | 16 | 2 | 2 |
|  | Burn 4 | 61 | 13 | 0 | 2 |
|  | Burn 5 | 39 | 7 | 1 | 2 |
| Sample2 | Burn 1 | 1 | 1 | 1 | 1 |
|  | Burn 2 | 1 | 2 | 1 | 17 |
|  | Burn 3 | 56 | 2 | 13 | 6 |
|  | Burn 4 | 97 | 16 | 1 | 4 |
|  | Burn 5 | 0 | 11 | 1 | 2 |
| Sample3 | Burn 1 | 0 | 1 | 0 | 1 |
|  | Burn 2 | 1 | 1 | 5 | 2 |
|  | Burn 3 | 45 | 3 | 15 | 1 |
|  | Burn 4 | 145 | 29 | 3 | 0 |
|  | Burn 5 | 0 | 1 | 8 | 0 |
| % of indicator Flag burned | Sample 1 | 0 | 25 | 0 | 0 |
|  | Sample 2 | 0 | 0 | 0 | 0 |
|  | Sample 3 | 0 | 0 | 0 | 0 |
| Cotton Ignition Y/N | Sample 1 | n | n | n | n |
|  | Sample 2 | n | n | n | n |
|  | Sample 3 | n | n | n | n |
| Pass/Fail | Sample 1 | F | F | P | P |
|  | Sample 2 | F | P | P | P |
|  | Sample 3 | F | P | P | P |

The cables made with compounds of the invention demonstrated low burn time, uncharred indicator flag and no flame drips.

While in accordance with the patent statutes, the best mode and preferred embodiment has been set forth, the scope of the invention is not limited thereto, but rather by the scope of the attached claims.

The invention claimed is:

1. A flame retardant thermoplastic polyurethane ("TPU") composition consisting of:
   a) at least one thermoplastic polyurethane polymer, and
   b) an organic non-halogenated flame retardant package which contains non-reacted components comprising,
      i) an organic phosphate compound which is melamine free,
      ii) a mixture of an organic phosphate in combination with 1) an organic phosphoric acid compound, or 2) phosphoric acid; and
      iii) zinc oxide,
   c) at least one stabilizer,
   d) talc, and
   e) optionally non-flame retardant additives.

2. The flame-retardant thermoplastic polyurethane composition of claim 1 wherein the flame retardant package comprises the organic phosphate compound selected from the group consisting of triarylphosphate, polyarylphosphate esters, such as triphenylphosphate, tricresylphosphate, trixylylphosphate, cresyl diphenylphosphate, diphenyl xylylphosphate, 2-biphenylydiphenylphosphate, alkylated polyaryl phosphate esters such as butylated triphenylphosphate, t-butylphenyl diphenylphosphate, bis(t-butyl)phenylphosphate, tris(t-butylphenyl) phosphate, tris(2,4-di-t-butylphenyl) phosphate, isopropylated triphenylphosphates, isopropylated t-butylated triphenylphosphates, t-butylated triphenylphosphates, isopropylphenyl diphenyl phosphate, bis(isopropylphenyl)phenylphosphate (3,4-diisopropylphenyl) diphenylphosphate, tris(isopropylphenyl)phosphate, (1-methyl-1-phenylethyl)phenyl diphenyl phosphate, nonylphenyl diphenyl phosphate, 4-[4-hydroxyphenyl(propane-2,2-diyl)] phenyl diphenyl phosphate, 4-hydroxyphenyl diphenyl phosphate, resorcinol bis(diphenyl phosphate), bisphenol A bis (diphenyl phosphate), bis(ditolyl)isopropylidenedi-p-phenylene bis(phosphate), O,O,O',O'-tetrakis(2,6-dimethylphenyl)-O,O'-m-phenylene bisphosphate, alkylarylphosphate esters such as 2-ethylhexyl diphenylphosphate, isodecyl diphenylphosphate, diethylphenethylamidophosphate diisodecyl phenyl phosphate, dibutyl phenyl phosphate, methyl diphenyl phosphate, butyl diphenylphosphate, diphenyl octyl phosphate, isoctyl diphenyl phosphate, isopropyl diphenyl phosphate, diphenyl lauryl phosphate, tetradecyl diphenylphosphate, cetyl diphenyl phosphate, tar acids cresylic diphenyl phosphates, trialkyl phosphate esters, such as triethylphosphate, tributylphosphate, tri(butoxyethyl)phosphate, 3-(dimethylphosphono) propionic acid methylamide, pentaerythritol cyclic phosphate, and combination thereof.

3. The flame-retardant thermoplastic composition of claim 1 wherein organic phosphate in the flame retardant package component is present in the amount from about 5 to about 25 percent of the total weight of the TPU composition.

4. The flame retardant thermoplastic polyurethane composition of claim 1 wherein the phosphate compound in the mixture of organic phosphate in combination with organic phosphoric acid in the flame retardant package is selected from the group consisting of piperazine pyrophosphate, piperazine polyphosphate and combinations thereof.

5. The flame-retardant thermoplastic polyurethane composition of claim 1 wherein the mixture of organic phosphate in combination with organic phosphoric acid in the flame retardant package is in the weight ratio of phosphate to phosphoric acid as about 1:0.1.

6. The flame-retardant thermoplastic polyurethane composition of claim 1 wherein the organic phosphoric acid compound in the mixture in the flame retardant package is selected from the group consisting of melamine pyrophosphate, melamine polyphosphate, melamine phosphate and combinations thereof.

7. The flame retardant thermoplastic polyurethane composition of claim 1 wherein the mixture in the flame retardant package is present in the amount of about 10 to 60 weight percent of the total TPU composition.

8. The flame retardant thermoplastic polyurethane composition of claim 1 wherein the non-flame retardant additives components are selected from the group consisting of colorants, antioxidants, antiozonates, stabilizers, inert fillers, lubricants, inhibitors, hydrolysis stabilizers, light stabilizers, heat stabilizers, discoloration stabilizers, dyes, pigments, inorganic fillers, organic fillers, reinforcing agents and combinations thereof and wherein such additives are present in the amount from 0.1 to 30 weight percent of the total weight of the TPU composition.

9. The flame retardant thermoplastic polyurethane composition of claim 1 wherein the stabilizer is present in the amount of from about 0.1 to about 5 weight percent of the TPU composition.

10. The flame retardant thermoplastic polyurethane composition of claim 1 wherein the stabilizer is selected from the group consisting of antioxidants such as phenolics, phosphites, thioesters, and amines, light stabilizers such as hindered amine light stabilizers and benzothiazole UV absorbers, other process stabilizers, and combinations thereof.

11. The flame retardant thermoplastic polyurethane composition of claim 1 wherein the thermoplastic polyurethane polymers are selected from the group consisting of polyester polyurethane, polyether polyurethane, polycarbonate polyurethane blends and combinations thereof.

12. The flame retardant thermoplastic polyurethane composition of claim 1 wherein the flame retardant package confers at least one predetermined flame retardant characteristic to the thermoplastic polyurethane composition selected from the group consisting of limited oxygen index of at least about 30 as measured according to ASTM D2863, a V0 flame rating at a thickness of 125 mils with non dripping properties as measured in accordance with UL 94, low smoke characteristics of a smoke density ($D_s$) at 1.5 min <100 and ($D_s$) at 4 min <200 in either flaming or non-flaming mode as measured by ASTM E662 and wherein the physical properties of the TPU composition have a tensile strength of greater than 3000 psi as measured by ASTM D412.

13. A method of making a flame retardant thermoplastic polyurethane composition comprising mixing a flame retardant package consisting of:
a) an organic phosphate compound which is melamine free,
b) a mixture of an organic phosphate in combination with an organic phosphoric acid compound;
c) zinc oxide, and
d) at least one thermoplastic polyurethane polymer and at least one stabilizer,
wherein the components of the package do not react.

14. A process for producing a flame retardant thermoplastic polyurethane composition comprising:
a) mixing the thermoplastic polyurethane ingredients comprising a polymer intermediate selected from the group consisting of a hydroxyl terminated polyester, hydroxyl terminated polyether, a hydroxyl terminated polycarbonate and mixtures thereof a polyisocyanate and a chain extender in a mixing device capable of shear mixing of thermoplastic polyurethane ingredients; and
b) adding the organic non-halogenated flame retardant package to the mixing device wherein the flame retardant package includes a first organic phosphate compound which is melamine free present at the level of about 5 to about 25 percent; a second mixture of an organic phosphate in combination with an organic phosphoric acid compound where the mixture is present at a level of about 10 to about 45 weight percent; and a third flame retardant component of a zinc oxide wherein the zinc oxide is present in the level of about 0.01 to about 5 weight percent, where the components of the package do not react; and
c) at least one stabilizer comprising antioxidants such as phenolics, phosphites, thioesters, and amines, light stabilizers such as hindered amine light stabilizers and benzothiazole UV absorbers, and other process stabilizers or combinations thereof and present at a level from about 0.1 to about 5 weight percent;
wherein the flame retardant package confers at least one predetermined flame retardant characteristic to the thermoplastic polyurethane composition; and
resulting in a TPU composition with excellent tensile strength and improved high flame performance and low smoke properties.

15. A wire and cable construction comprising:
a) at least one metal conductor where said conductor is insulated with a non conducting polymeric material, and
b) a flame retardant jacket covering said insulated metal conductor wherein said jacket is a thermoplastic polyurethane composition consisting of,
  i) at least one thermoplastic polyurethane polymer, and
  ii) an organic non-halogenated flame retardant package which contains non-reacted components comprising,
    a) an organic phosphate compound which is melamine free,
    b) a mixture of an organic phosphate in combination with an organic phosphoric acid compound; and
    c) zinc oxide
  iii) at least one stabilizer,
  iv) optionally inorganic flame retardant components, and
  v) optionally non-flame retardant additives.

16. The wire and cable construction of claim 15 where in the wire and cable constructions are made by extruding the TPU composition onto a bundle of insulated conductors to form a jacket around the insulated conductors.

17. A process for producing a wire and cable construction of claim 15 wherein the process of forming the flame retardant thermoplastic polyurethane composition is in a continuous an in-situ process.

18. A process for producing a wire and cable construction comprising:
a) extruding an insulated layer of non-conducting polymeric material of at least one metal conductor,
b) extruding a flame retardant jacket to cover at least one insulated metal conductor; where the jacket is a thermoplastic polyurethane composition comprising consisting of,
  i) at least one thermoplastic polyurethane,
  ii) an organic non-halogenated flame retardant package comprising non-reacted components comprising, i. from about 5 to about 25 weight percent of a first organic phosphate compound which is melamine free;
ii. from about 10 to about 60 weight percent of a second organic non-halogen flame retardant component comprising a mixture of a organic phosphate in combination with an organic phosphoric acid compound and
iii. a zinc oxide;
iii) from about 0.01 to about 5 weight percent of at least one stabilizer and wherein the weight percent's are based on total weight of the thermoplastic polyurethane composition, resulting in a wire and cable that has flame retardant properties, abrasion resistance and good tensile strength.

\* \* \* \* \*